E. K. BAKER.
DEMOUNTABLE WHEEL RIM.
APPLICATION FILED MAR. 29, 1916.
1,310,047.
Patented July 15, 1919.
4 SHEETS—SHEET 1.
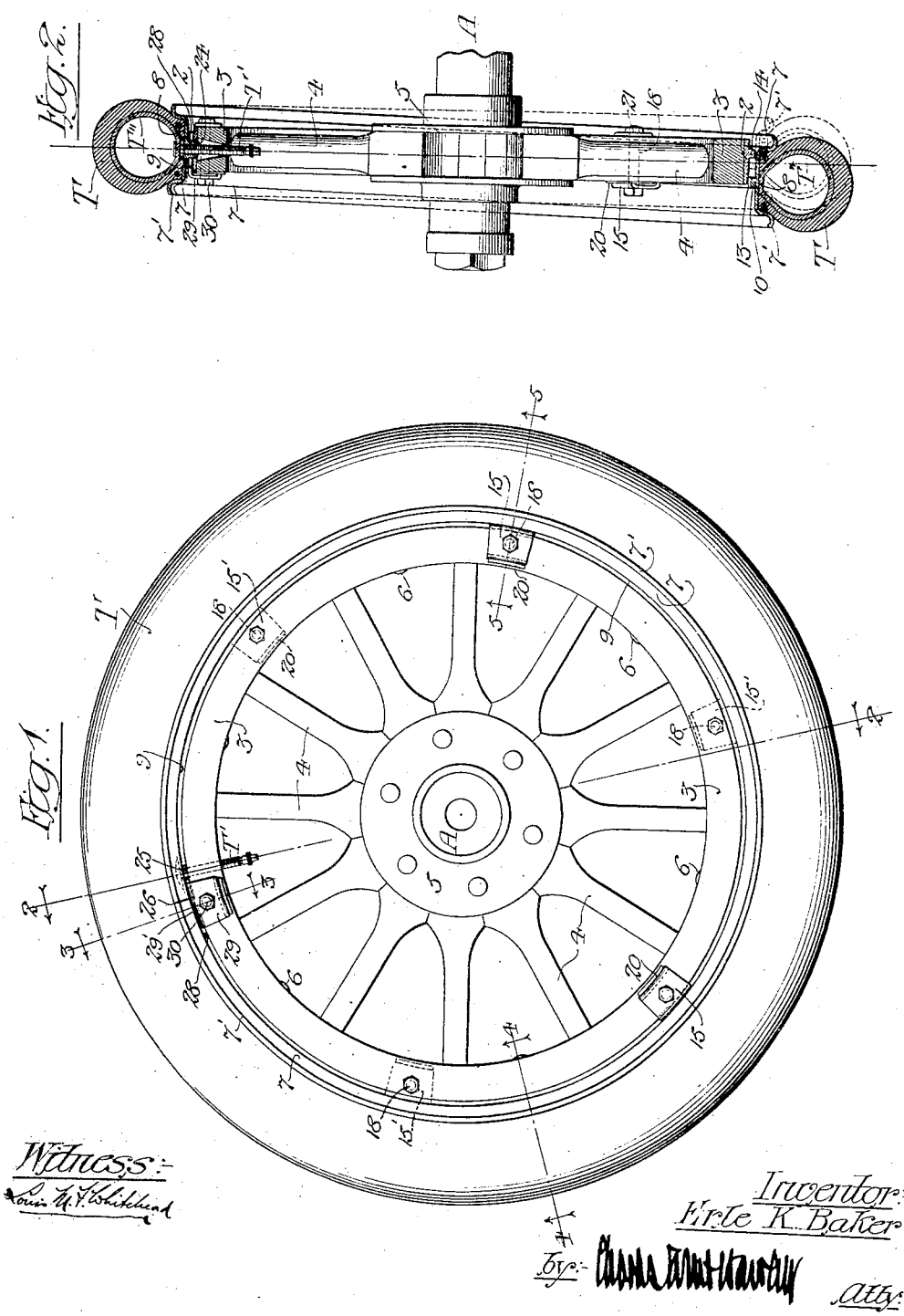

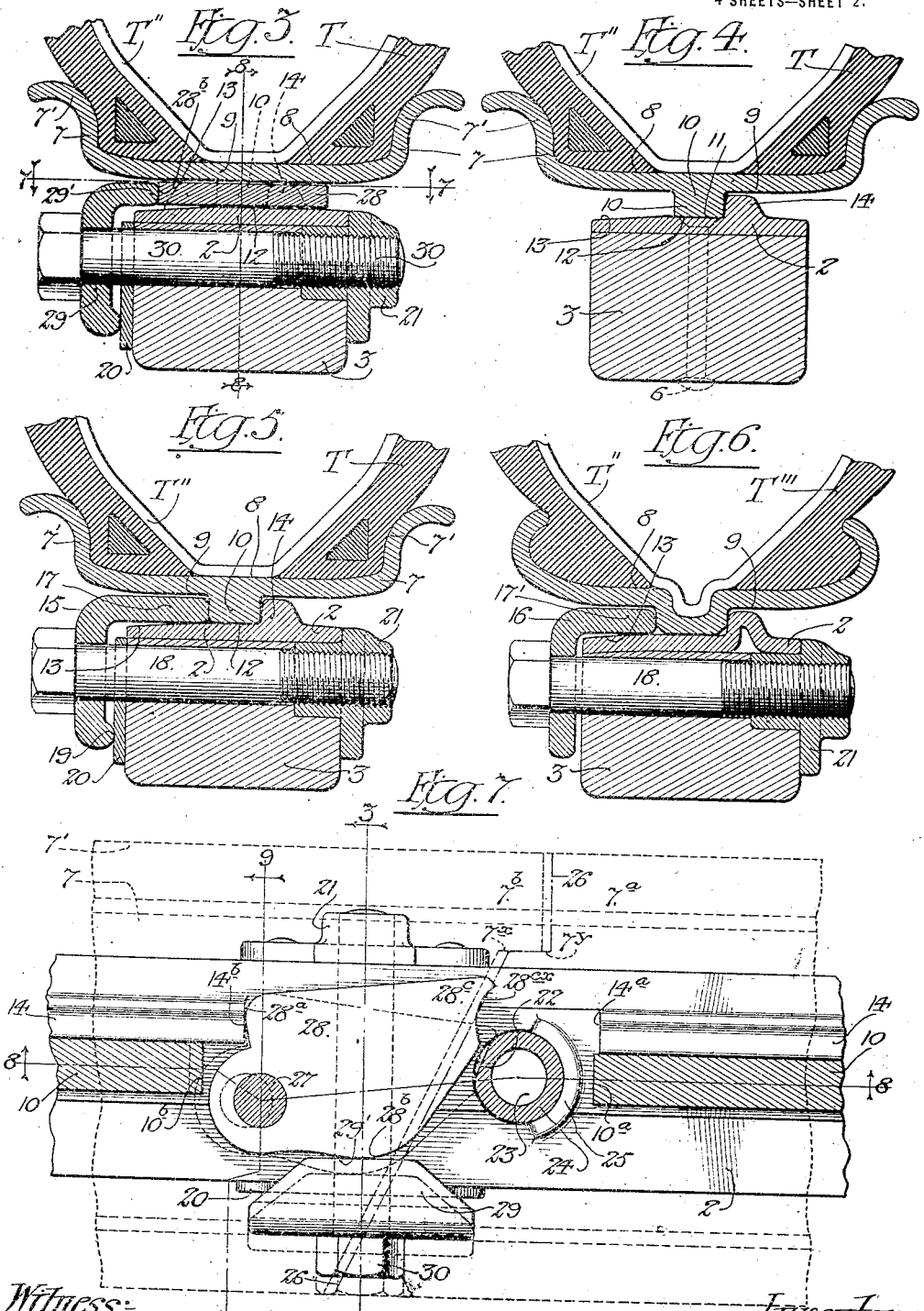

E. K. BAKER.
DEMOUNTABLE WHEEL RIM.
APPLICATION FILED MAR. 29, 1916.
1,310,047.
Patented July 15, 1919.
4 SHEETS—SHEET 3.
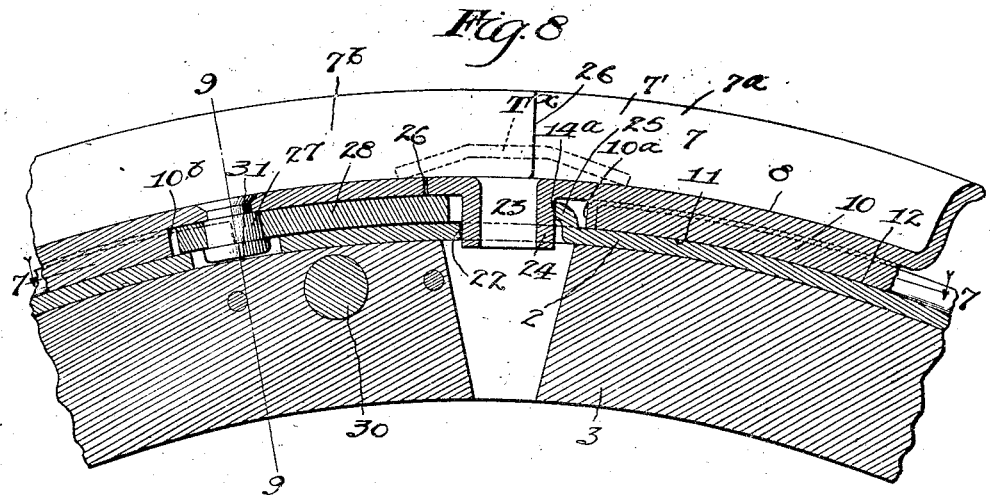
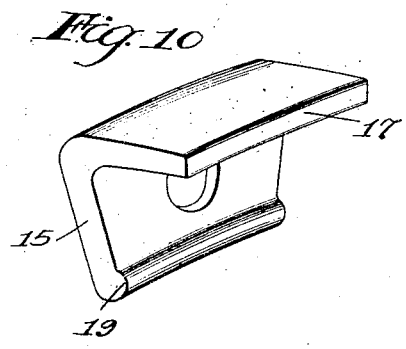
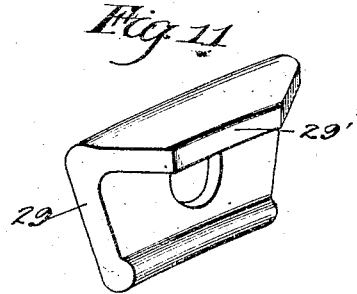
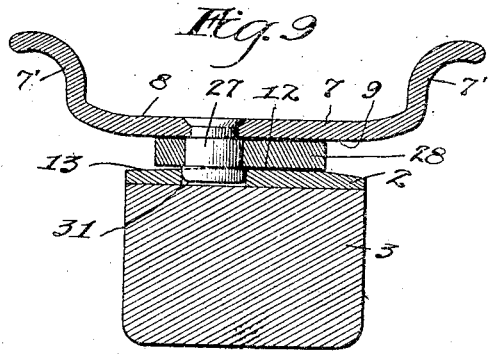
Inventor:
Erle K. Baker.

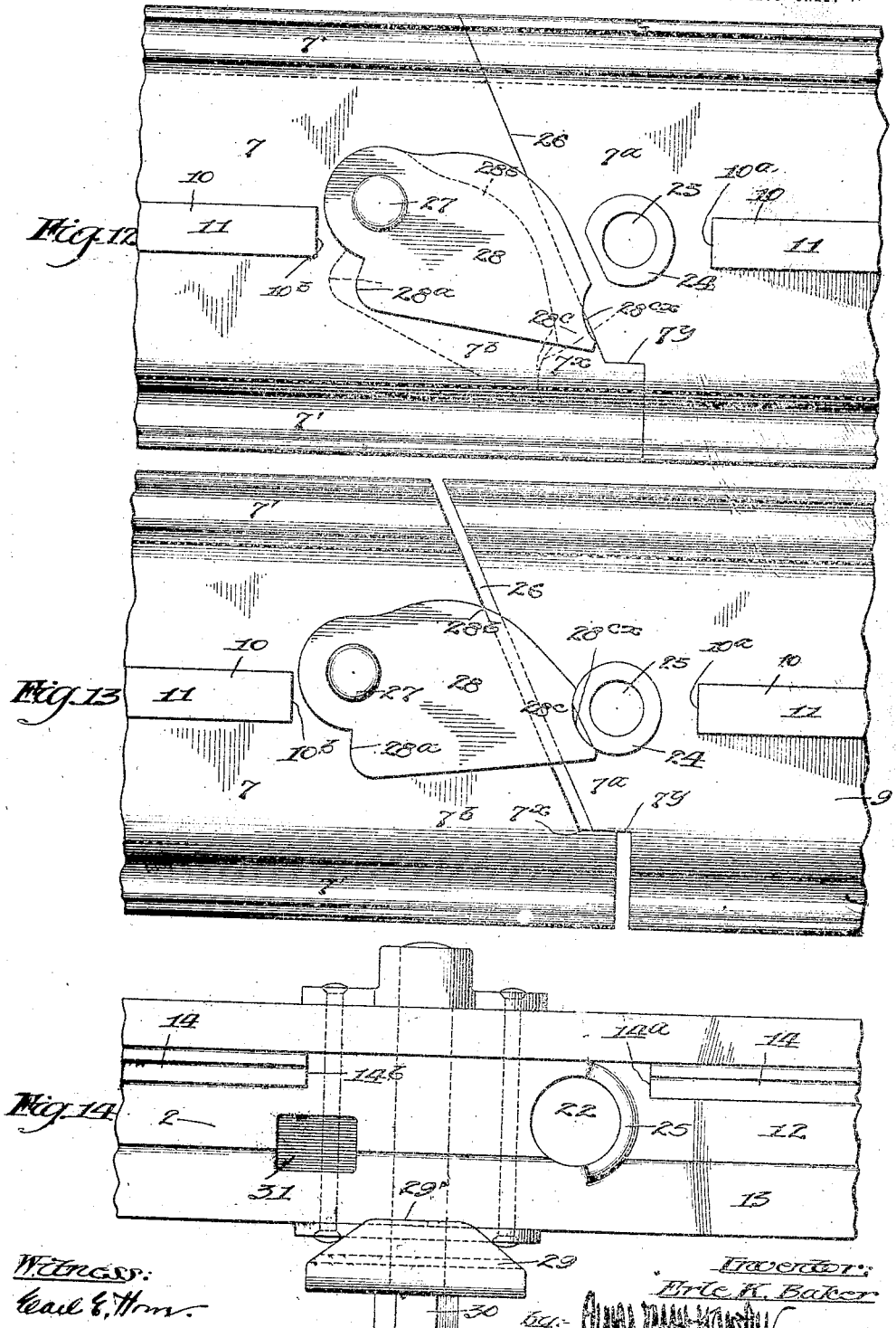

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE WHEEL-RIM.

1,310,047.   Specification of Letters Patent.   Patented July 15, 1919.

Application filed March 29, 1916.  Serial No. 87,600.

*To all whom it may concern:*

Be it known that I, ERLE KING BAKER, a citizen of the United States, residing at Chicago, Cook county, Illinois, have invented certain new and useful Improvements in Demountable Wheel-Rims, of which the following is a specification.

My invention relates to demountable rim constructions for motor vehicle wheels which are equipped with tires that require changing from time to time.

In this application I shall disclose and claim a modification of the subject matter of my companion application, Serial No. 85,293, filed March 20, 1916, patented May 16, 1916, No. 1,183,518.

It is the usual practice to put a pneumatic tire upon a demountable rim, and there inflate it before mounting the rim on the wheel of the motor vehicle. In event the tire is injured or deflated, the rim is demounted, and replaced by another bearing an inflated tire; and the detaching of the injured tire from its rim, as well as the repairing of the tire, may be postponed.

The objects of my invention will be made clear by the following statement of the problems and needs presented by the above defined practice.

The construction of a pneumatic tire is such that it does not lend itself to ready adjustment upon a rim or wheel. The rim should be so made that it will be easy to attach and detach the tire, and the rim must be capable of safely and securely holding the tire, whether in service on the wheel or being carried as an inflated "spare". The rim and wheel construction should be such that it will be easy to both mount and demount the rim with its tire (whether inflated or deflated) and at the same time provide for the secure and dependable holding of the rim and tire against movement on the wheel during service. The true circular form of the tire and rim should be constantly maintained. The tire should be held truly perpendicular to the axis of the wheel. The distortion of either the rim or the tire should be avoided. The concentricity of the tire and rim with respect to the axis of the wheel should be positively insured and constantly maintained. Unless the demounting means responds to the above requirements the structure cannot be pronounced safe or desirable, and if the circularity, concentricity and perpendicularity of the tire are not maintained, it will be found that the life of the tire is materially shortened. In addition to these requirements, it is essential that the construction shall be of the least weight consistent with the service to be performed, and it is commercially necessary that the cost of both manufacture and maintenance shall be low.

For use with standard clencher tires which have base beads that may be stretched over its flanges, the rim may be of the integrally flanged endless type, and, to that extent, simpler than those required for tires having non-stretchable base beads. But in all other respects, the problem remains the same: for the matters of demountability, security, non-distortion, circularity, concentricity and perpendicularity are of equal importance as to all tires.

The specific object of my invention is to provide a demountable rim construction which shall be applicable to rims and tires of all types, and which shall provide a complete solution of all of the above stated problems.

The general nature and principles of my invention, and also the details of the best embodiment thereof that I have thus far devised, will be readily understood on reference to the drawings which form part of this specification; and are particularly pointed out in the appended claims.

Referring now to the said drawings:—
Figure 1 is an outer side elevation of a fully equipped motor vehicle wheel embodying my invention:—Fig. 2 is a cross section, as on the line 2—2 of Fig. 1, but showing the rim in the act of being buttoned on to the wheel;—Fig. 3 is a cross section on the line 3—3 of Fig. 1, enlarged to full size;—Fig. 4 is a section on the line 4—4 of Fig. 1;—Fig. 5 is a section on the line 5—5 of Fig. 1;—Fig. 6 is a similar section, but showing an endless front stop ring as a substitute for the several front stop lugs depicted in Figs. 1, 3 and 5, and showing also the adaptation of the invention to a transplit clencher rim;—Fig. 7 is a plan section on the lines 7—7 of Figs. 3 and 8, showing the rim-contracting device:— Fig. 8 is a vertical, circumferential section on the lines 8—8 of Figs. 3 and 7;—Fig. 9 is a cross section on the lines 9—9 of Figs. 7 and 8;—Fig. 10 is a perspective of one of the main front stop lugs;—Fig. 11 is a like view of the stop lug which operates the contracting device;—Fig. 12 discloses the appearance of the inner periphery of the demountable rim at the split, showing the contractor in the position which it assumes in contracting the rim;—Fig. 13 is a similar view showing the rim ends separated by the contractor as when holding an inflated tire in readiness to be mounted on the wheel: and, Fig. 14 is a plan view of the wheel periphery, showing the portion containing the valve stem opening and the space for the rim end contracting device.

The structure herein shown embodies the same generic idea as my said companion application Serial Number 85,293, filed March 20, 1916, and now issued as Patent No. 1,183,518, dated May 16, 1916, in so far as the contact between the present demountable rim and wheel periphery is limited to a single circumferential line in the middle or neutral plane of the tire, rim and wheel and possesses like advantages in the matter of balance, concentricity, circularity and perpendicularity.

The wheel shown in the drawings is an automobile wheel of the kind in most common use, but is distinguished therefrom by a fixed rim or felly-band, 2, of novel form and function. In ordinary practice a wooden felly, 3, is compressed within the fixed rim, 2. The wheel spokes, 4, are secured in the felly, 3, and in the hub, 5. These details are explained only for the purpose of showing that the fixed rim, 2, is circular and concentric with the axis, A, of the wheel; and is rigid in that relation to the hub. The fixed rim, 2, need not be wider than the felly. It may be fastened thereon by the usual felly-band bolts or rivets, 6, as indicated in Fig. 1, and by dotted lines in Fig. 4.

Throughout the drawings, the demountable rim is marked, 7. The tire seat, 8, thereof may be conformed or fitted to the cross section of any of the several types of tires now or hereafter commonly used. In most of the figures of the drawings I have shown the rim shaped to receive tires, T, of the well-known "straight side" and "Q. D." types, while in Fig. 6 the rim is shown conformed to the cross-section of a tire, T³, of the clencher type. As hereinafter explained, I so construct the rim that it is not necessary to either circumferentially split the same, or to provide it with a separable flange, in order to adapt it to receive tires that cannot be stretched over its flanges. That is, I prefer that the tire retaining flanges, 7', of the rim, whatever its cross section, shall be integral with its body portion and that the rim shall be transplit, (preferably in the manner hereinafter described) and that made easy of application to all tires. Whatever the shape of its tire seat, the rim is of substantially uniform thickness from edge to edge. It is of greater width than the fixed rim, 2, and the portion of its internal periphery, 9, which is opposed to the wheel periphery, is substantially cylindrical. In these particulars my novel rim conforms to the best modern practice and lends itself to manufacture by machinery now in general use by rim makers.

The inner periphery of my novel demountable rim is distinguished from other rims by the presence of a single circumferential rib, 10. As shown, this rim is positioned midway between the edges of the rim; in other words, it occupies the middle or neutral plane of the rim. By preference, this rib forms the only support of the rim proper upon the wheel, and thus supported the rim is held in ideally balanced condition upon the wheel; a condition in which it is best fitted to resist the strains and stresses to which it is subjected in the working position which it occupies between the tire and the wheel. The inner surface, 11, of the rib, 10, is cylindrical, and finds a seat upon the periphery of the fixed rim, as hereinafter described.

As shown, the rib, 10, is of much less width than the fixed rim and wheel felly. Said fixed rim is provided with a complementary narrow cylindrical surface or seat, 12, to receive the rib, 10, of the rim. At the outer edge of the seat, 12, the fixed rim is provided with a peripheral portion, 13, which is a gentle cone, or may be curved. The only purpose in forming the portion, 13, in this manner is to allow the rim to "button on" to the wheel with less "clearance" than would be required if the surface, 12, extended to the outer edge of the fixed rim. At the rear side of the seat, 12, the fixed rim is formed with a raised circumferential stop rim, 14, against which the rib, 10, of the rim is placed, and by which the perpendicularity of the rim and wheel axis is insured. The rib, 14, is preferably of less height than the rib, 10, when seated; and its top does not contact the inner periphery, 9, of the demountable rim. The peripheral contact-surface or seat, 12, is best positioned in the middle plane of the wheel, to correspond with the position of the rim-rib, 10. The height and the width of the circumferential ribs, 10, and 14, need be no greater than required to safely bear the strains and stresses to which they are subjected; but, to give them the appearance of more than adequate strength, I prefer that their proportions shall be substantially as shown in Fig. 4.

For engagement with the outer side of the rib, 10, when the rim is positioned on the wheel, I employ a plurality of stop lugs, 15. There may be two of these lugs, 15, as shown in Fig. 1; or the number may be increased as shown by dotted lines, 15′, in Fig. 1. Or, as shown in Fig. 6, a stop ring, 16, in the form of a circumferentially curved angle-bar may be substituted for the separate lugs, 15. In either case the outer stops are provided with inner ends, 17, or 17′, adapted to press against the rim, 10, as respectively shown in Figs. 5 and 6. And in either case the outer stops are held, and operated, by transverse bolts, 18, provided in the felly-band, beneath the fixed rim, 2.

As hereinafter explained, the outer stops are applied after the rim-rib, 10, is seated on the wheel felly. Their office is largely precautionary, for they are subjected to only slight strain and in practice two of the stop lugs, 15, are sufficient. Where the separate stops lugs, 15, are used I provide them with bearing ribs, 19, and prefer to protect the wooden felly therefrom by means of washers, 20. The illustrated bolts, 18, and the fixed nuts, 21, which bear against the rear edge of the fixed rim, are of familiar construction.

As shown in Figs. 1 and 2, the valve stem, T′, of the tire, T, extends through a hole in the rim, 7, and when the rim and tire are placed on the wheel the valve stem, T′, is accommodated in a valve stem hole, 22, provided in the fixed rim, 2 and felly, 3. This is the ordinary position and relation of these parts. A rim having a valve stem thus positioned is mounted on the wheel by a swinging action known as the "buttoning on" of the rim. By a reverse operation it is "unbuttoned". At such time the valve stem serves as a hinge point or pivot on which the rim swings, and there must be sufficient clearance between the opposite side of the rim and the wheel periphery to allow the rim to pass to proper position on the latter. The "buttoning on" action of the rim is represented by full and dotted lines in Fig. 2. The dotted lines show the rim and tire as finally positioned on the wheel.

In the present case very little clearance is required between the rim and wheel to permit the "buttoning" and "unbuttoning" of the rim. If the two cylindrical seating surfaces, 11 and 12, were of the same circumference, that action would not be possible, or at least could only be accomplished by forcibly stretching the rim, which is impracticable. The clearance required is secured by slightly coning or rounding the surface, 13, of the fixed rim; and, by slightly enlarging the circumference of the rim preparatory to putting it on the wheel.

Lest it be thought that this preëxpansion of the rim is unnecessary, I will here explain that if the complementary fixed and demountable rims are to be durable, they must be firmly seated together when in service. Therefore, no clearance should be allowed between the cylindrical surfaces, 11, 12, at such times. And as firm contact can not well be obtained by sliding the rim on to the wheel, and as one cylindrical seat of fixed circumference can not be buttoned on to another cylindrical seat of the same circumference, it is essential to either preëxpand the demountable rim, or pre-contract the fixed rim. Of the two, I prefer the preëxpansion of the demountable rim. The pre-contraction of the fixed rim is suggested and claimed in my companion application Serial Number 86,599, filed March 25, 1916, patented October 22, 1918, No. 1,282,362. The means which I use for expanding and contracting the demountable rim, are novel and will be explained in detail.

As best shown in Figs. 7, 8, 12, and 13, the rib, 10, of the demountable rim is cut-away between points, 10$^a$ and 10$^b$, to make room for the valve stem and the contracting device. As best shown in Figs. 7, 8, and 14, the stop rib, 14, on the wheel is similarly cut away between the points, 14$^a$ and 14$^b$. The valve stem hole, 23, in the demountable rim is placed near the point 10$^a$, and is slightly larger than the valve stem, T′. To provide a "driver" or driving connection between the rim and the wheel, I form on the inner periphery of the rim, a circular stud, 24, which fits in the slightly larger hole, 22, in the fixed rim. The hole, 22, is positioned near the end, 14$^a$, of the stop rib, 14. The driving stud is preferably pressed from the body of the demountable rim, being an annular flange integral therewith and containing the valve stem hole, 23. By preference I strike-up the portion, 25, of the fixed rim, to meet the hollow driving stud, 24, close beneath the rim, 7.

I transversely split the rim, 7, upon a diagonal line, 26, in order that the rim readily may be separated helically, as and for the purposes set forth in Patents No. 1,095,778 and No. 1,095,996. The split is close to the valve stem hole, 23, and hence the spreader (see dotted line, T$^x$, Fig. 8) of the valve stem covers the exposed portion of the split and protects the inner tube, T″, of the tire, T, therefrom. In the present case this closing of the split by the spreader allows the opening and closing of the split without danger to the inner tube. The transplit, 26, is made by shearing or sawing the rim; and, obviously, provides the rim with complementary ends. To make the rims self-alining, and to positively hold them against lateral separation by the force of an expanded tire, I make a jog in the split and thus provide the ends with laterally abutting shoulders, 7$^x$ and 7$^y$. The shoulders are in longitudinal alinement with the side flange of the rim and do not interfere with the separation of the rim ends, either laterally or circumferentially, when it is desired to attach or detach the rim from the tire. These shoulders will be again referred to herein.

The expanding and contracting device in its entirety comprises four parts, to-wit,—27, 28, 29, and 30. The part, 27, is a stud, or rivet, secured in the rim, 7, near the rib-end, 10ᵇ, and preferably offset therefrom, toward the outer edge of the rim. The part, 28, is virtually a bell-crank, which is pivoted on said rivet, 27, and is provided with three arms, 28ᵃ, 28ᵇ, and 28ᶜ. The arm, 28ᵃ, is positioned for engagement with the end, 14ᵇ, of the rib, 14. The arm, 28ᶜ, is provided with a holding notch or recess, 28ᶜˣ, to fit the side of the valve stem reinforcement or driver, 24, as shown in Fig. 13. And the bell-crank arm, 28ᵇ, is positioned to be acted upon by the actuating member, 29. The part, 29, is a pressure lug, much like the lugs, 15, but preferably shorter. Its nose, 29′, overhangs the edge of the fixed rim, in position to engage the arm, 28ᵇ, of the bell-crank, 28. The part, 30, is a bolt which passes through the shank of the lug, 29, and is the means used for pressing the same against the bell-crank, 28. I prefer that the pivot rivet, 27, shall be long enough to pass through a circumferentially elongated slot, 31, in the fixed rim.

To attach the demountable rim to the tire, the bell-crank, 28, on the rim-end, 7ᵇ, is first swung away from the rim end, 7ᵃ, as shown by dotted lines in Fig. 12. The ends are then separated laterally. The rim end, 7ᵃ, is then placed on the beads of the tire and the valve stem, T′, is put through the hole, 23, into the rim. The rim is then helically pressed on to the tire, beginning at the end, 7ᵃ, and progressing to the end, 7ᵇ, which is the last to pass into position on the tire beads.

In modern practice, the internal circumference of the beads of a "straight side" tire is one-sixteenth of an inch greater than the corresponding circumference of the tire seat, 8, of the rim. When the rim is first applied, the ends 7ᵃ and 7ᵇ, will be in abutment. I take advantage of the sixteenth of an inch "tolerance" between the rim and tire and next separate the rim ends, 7ᵃ, 7ᵇ, circumferentially. The bell-crank, 28, is the means which I use to thus expand the rim and hold its ends apart within the tire. As shown in Fig. 13, the notched end, 28ᶜ, of the bell-crank, 28, is snapped against the opposed side of the driving lug, 24, and effectively braces the rim ends apart. Lateral displacement of the rim ends at such time is prevented by the abutting shoulders, 7ˣ and 7ʸ. With the rim in this condition, the tire is inflated, and thus prepared for service.

As will be evident, the internal circumference, 11, of the rim-supporting rib, 10, is then at least one-sixteenth of an inch greater than the circumference of the seat, 12, on the periphery of the wheel. This difference of circumference provides the clearance which is necessary to the "buttoning on" of the rim. In placing the rim with its inflated tire upon the wheel, the valve stem, T′, and the driver, 24, are first positioned in the valve stem hole, 22, in the wheel. The opposite side of the rim (usually the lower side) is then swung into position, so that the rim rib, 10, rests against the stop rib, 14, on the wheel. It will be understood that at that time the lugs, 15, have been removed. Having positioned the rim on the wheel, I then replace the lugs, 15, and tighten them to the extent necessary to lightly hold the rim in place.

At the time the rim is first placed on the wheel the bell-crank, 28, the driving stud, 24, and the pivot stud, 27, assume the positions best shown in Fig. 7. That is, the stud, 27, drops into the slot, 31, and the shoulder or arm, 28ᵃ, of the bell-crank lightly engages the end, 14ᵇ, of the rib, 14. With the rib, 10, positioned against the rib, 14, that is, fully "buttoned" in place, the plate-like bell-crank, 28, lies flat on the top of the fixed rim, as shown in Figs. 3 and 7. Its arm, 28ᵇ, is thus positioned against the nose, 29′, of the pressure-lug, 29.

The next operation consists in tightening the pressure-lug, 29, against the bell-crank. At that time the end, 7ᵃ, of the rim is found to be fixed in position on the wheel by the engagement of its driving stud, 24, with the fixed rim; and, when the pressure-lug, 29, is screwed home the bell-crank is thereby forced from the position shown in dotted lines in Fig. 7, to the position shown in full lines. During that movement the bell-crank arm, 28, acts against the end, 14ᵇ, of the rib, 14, as a fulcrum; and as the bell-crank turns on this fulcrum, the pivot stud, 27, is moved circumferentially of the wheel. In other words, the rim-end, 7ᵇ, is moved or contracted into substantial abutment with the rim end, 7ᵃ. This contractive movement is indicated by the full and dotted lines which show the rim ends, 7ᵃ and 7ᵇ in Fig. 7. In this manner, the rim is positively and very strongly contracted, and thus its supporting-rib, 10, is firmly clamped on the circumferential seat or periphery, 12, of the wheel. The nose, 29′, of the actuating lug, 29, remains in engagement with the bell-crank and thus the bell-crank is held in position against the end of the rib, 14; hence, the rim end, 7ᵇ, cannot become loose on the wheel. It should now be apparent that when in service-condition, both rim ends are positively secured to the wheel.

The purpose of the slot, 31, in the fixed rim, is to provide a side-bearing for the pivot stud, 27, and thus partly relieve the fastening in the rim, 7, from the contracting strain of the bell-crank. This side bearing is especially desirable when the bell-crank, 28, is used as an expander.

After the rim has been contracted in the manner described, the stop lugs, 15, are screwed home against the rib, 10, of the demountable rim, to further insure the retention of the rim.

I prefer to so proportion the parts that the rim ends, 7ª and 7ᵇ are not in actual abutment when the rim is contracted, a crack remaining between them so that pressure of the inflated tire may be effective to further contract the rim upon the wheel. By reason of this action I commonly refer to the construction as a "pneumatic clutch" between the demountable rim and the wheel.

In case the tire is deflated, the rim is relieved from the compressive force, just described, and upon taking off of the stop-lugs, the rim may be "unbuttoned" from the wheel. Instead of being objectionable, it is rather desirable that the rib, 10, shall rust to its seat on the fixed rim of the wheel. In that case the rim, because of its single-line contact with the wheel, may readily be dislodged by tapping on the rear edge of the rim. Or the lug, 29, may be backed off and the bell-crank, 28, may be driven forward between the rim and the wheel, to positively expand the rim. Any suitable means may be used to thus operate the bell-crank as an expander. It will be understood that at such times the part, 28, works between the pivot, 27, and the stud, 24.

I prefer that both the rim, 7, and the fixed rim, 2, shall be made from hot-rolled strips, of the cross-section best shown in Figs. 4 and 5; but, to those skilled in the art, it will be obvious that both rims may be shaped or rolled from flat stock, as indicated in Fig. 6. It is practicable, and not difficult, to form the coacting ribs in that way.

To those who are skilled in the art, it will be apparent that by means of the structure herein disclosed, I accomplish the fulfilment of all the objects and requirements set forth in the opening paragraphs of this specification.

While I have illustrated and described my invention in accordance with the patent statutes, I desire it to be understood that the details of construction may be materially varied, and that many changes, modifications and substitutions may be made in the demountable rim construction herein illustrated without departing from the spirit and scope of my invention as set forth in the appended claims.

I claim:—

1. The improvement herein described, comprising a wheel, in combination with a tire-carrying transplit rim demountably held thereon in only single narrow-line cylindrical contact therewith.

2. The improvement herein described, comprising a wheel, in combination with a tire-carrying transplit rim demountably held thereon in only single narrow-line cylindrical contact therewith at the neutral plane of the rim.

3. The improvement herein described, comprising a wheel, in combination with a tire-carrying transplit rim pneumatically clutched thereon in only single narrow-line cylindrical contact therewith at the neutral plane of the rim.

4. The improvement herein described, comprising a wheel, in combination with a tire-carrying transplit rim clutched thereon in only single narrow-line cylindrical contact therewith, and front and back stops on said wheel and alining the rim therewith.

5. The improvement herein described, comprising a wheel provided with a circumferential stop rib, in combination with a tire carrying transplit rim having at its neutral plane a circumferential supporting rib held against said rib on the wheel and presenting a narrow-line cylindrical surface to the periphery of the wheel, and means for positively contracting the rim to seat said supporting rib on said periphery.

6. The improvement herein described, comprising a wheel having a circumferential rim-rib seat and provided with a circumferential stop rib back of said seat, in combination with a tire-carrying transplit rim having a cylindrical rib, and means for holding the rim expanded until positioned upon the wheel and for contracting the same thereon.

7. The improvement herein described comprising a wheel having a cylindrical rim-rib seat and provided with a circumferential stop-rib back of said seat, in combination with a tire-carrying transplit rim having a complementary cylindrical rib, means for holding the rim expanded until positioned upon the wheel and for contracting the same thereon, and suitable front stops on said wheel.

8. The herein described improved tire-carrying demountable rim having a circumferential neutral plane supporting-rib on its inner periphery and presenting a single-line cylindrical seat.

9. The herein described improved tire-carrying, demountable, transplit rim having a circumferential neutral-plane supporting-rib on its inner periphery and presenting a narrow-line cylindrical seat, said rib being interrupted adjacent the split in the rim, and the rim ends being there provided with rim driving projections, and a valve stem hole.

10. The herein described improved tire-carrying, demountable, transplit rim having a circumferential neutral-plane supporting-rib on its inner periphery and presenting a narrow-line cylindrical seat, said rib being interrupted adjacent the split in the rim, in combination with a bell-crank pivoted on one rim-end and a driving stud on the other rim end.

11. The herein described improved tire-carrying, demountable, transplit rim having a circumferential neutral-plane supporting-rib presenting on its inner periphery a narrow-line seat, in combination with an expanding and contracting device at the split therein, and a driver.

12. The improvement herein described, comprising a wheel containing a valve stem hole having a circumferential stop-rib which is interrupted opposite said hole, in combination with a demountable rim having a neutral-plane circumferential rib on its inner periphery to seat upon the periphery of said wheel alongside said stop rib, the rib on said rim being interrupted at one point, and said rim being transplit at that point and there provided with a driving stud, a bell crank pivoted on the inner periphery of said rim and having an arm to engage one end of said stop rib, and another formed to engage said stud on the rim, substantially as and for the purpose specified.

13. An integrally flanged demountable transplit rim having a driving stud on one rim end, in combination with a bell crank plate pivoted on the other end and having three arms, one formed to engage said stud.

14. The herein described improved tire-carrying, demountable, transplit rim having a circumferential neutral-plane supporting-rib on its inner periphery and presenting a narrow-line cylindrical seat, said rib being interrupted adjacent the split in the rim, in combination with a bell-crank pivoted on one rim-end together with a driving stud on the other rim-end together with an axially operable lug carried by the wheel for moving said bell-crank in one direction as and for the purpose specified.

In testimony whereof, I have hereunto set my hand this 27th day of March, 1916.

ERLE KING BAKER.